(12) United States Patent
Shibata (10) Patent No.: US 9,511,651 B2
(45) Date of Patent: Dec. 6, 2016

(54) CONTROLLER FOR OPENING AND CLOSING MEMBER

(71) Applicant: ASMO CO., LTD., Kosai, Shizuoka-pref. (JP)

(72) Inventor: Kazuyuki Shibata, Kosai (JP)

(73) Assignee: ASMO CO., LTD., Shizuoka-pref. (JP)

(\*) Notice: Subject to any disclaimer, the term of this patent is extended or adjusted under 35 U.S.C. 154(b) by 0 days.

(21) Appl. No.: 14/837,011

(22) Filed: Aug. 27, 2015

(65) Prior Publication Data

US 2016/0060943 A1     Mar. 3, 2016

(30) Foreign Application Priority Data

Sep. 1, 2014    (JP) .................................. 2014-177091

(51) Int. Cl.
| | |
|---|---|
| H02P 3/00 | (2006.01) |
| B60J 5/04 | (2006.01) |
| G05B 15/02 | (2006.01) |
| E05F 11/44 | (2006.01) |
| E05F 15/41 | (2015.01) |
| E05F 15/695 | (2015.01) |

(52) U.S. Cl.
CPC ............... *B60J 5/04* (2013.01); *E05F 11/445* (2013.01); *E05F 15/41* (2015.01); *E05F 15/695* (2015.01); *G05B 15/02* (2013.01); *E05Y 2400/31* (2013.01); *E05Y 2400/508* (2013.01); *E05Y 2900/55* (2013.01)

(58) Field of Classification Search
USPC .......................................... 49/26; 701/36–49
See application file for complete search history.

(56) References Cited

U.S. PATENT DOCUMENTS

| | | | | |
|---|---|---|---|---|
| 5,689,160 | A * | 11/1997 | Shigematsu | H02H 7/0851 318/281 |
| 6,051,945 | A * | 4/2000 | Furukawa | H02H 7/0851 318/264 |
| 6,166,508 | A * | 12/2000 | Kalb | E05F 15/70 318/286 |
| 6,477,806 | B1 * | 11/2002 | Asada | E05D 15/101 296/146.2 |
| 6,966,148 | B2 * | 11/2005 | Choi | E05F 11/483 296/155 |
| 7,178,854 | B2 * | 2/2007 | Ichinose | B60J 5/06 296/146.2 |

(Continued)

*Primary Examiner* — Jonathan M Dager
(74) *Attorney, Agent, or Firm* — Posz Law Group, PLC (57) ABSTRACT

A controller for an opening and closing member includes a driving mechanism, a detection portion, a control portion, and a determination portion. When the determination portion determines that the foreign matter exists in a period where the driving mechanism is operating, the control portion executes an interrupt operation to interrupt an operation of the driving mechanism. When the detection portion detects that the door is changed from the opening state to the closing state in a period from a time point before the determination portion determines that the foreign matter exists to a time point after the determination portion determines that the foreign matter exists, the control portion executes a restart operation to restart one of a first operation and a second operation that is the operation of the driving mechanism executed right before the interrupt operation.

11 Claims, 8 Drawing Sheets

(56) References Cited

U.S. PATENT DOCUMENTS

| | | | | |
|---|---|---|---|---|
| 7,579,708 B2* | 8/2009 | Shibata | | H02H 7/0851 307/10.1 |
| 7,782,001 B2* | 8/2010 | Herwig | | B60J 5/06 318/266 |
| 7,952,312 B2 | 5/2011 | Sakai et al. | | |
| 8,224,532 B2* | 7/2012 | Schmitt | | E05F 15/70 701/45 |
| 8,245,447 B2* | 8/2012 | Oh | | E05C 17/60 296/155 |
| 8,370,029 B2* | 2/2013 | Egger | | H02H 7/0851 318/266 |
| 8,564,227 B2* | 10/2013 | Stoger | | H02H 7/0851 318/127 |
| 9,074,402 B2* | 7/2015 | Higgins | | B60Q 9/00 |
| 2004/0119433 A1* | 6/2004 | Tanoi | | B60J 7/0573 318/469 |
| 2004/0168371 A1* | 9/2004 | Engelgau | | E05B 81/13 49/280 |
| 2004/0194385 A1* | 10/2004 | Ichinose | | E05F 5/003 49/26 |
| 2005/0017667 A1* | 1/2005 | Yamamoto | | H02H 7/0851 318/469 |
| 2006/0220604 A1* | 10/2006 | Hirai | | H02H 7/0851 318/286 |
| 2006/0290310 A1* | 12/2006 | Sumiya | | H02P 29/0044 318/471 |
| 2007/0107313 A1* | 5/2007 | Suzuki | | E05F 15/41 49/360 |
| 2007/0108929 A1* | 5/2007 | Hirai | | H02H 7/0851 318/282 |
| 2007/0119100 A1* | 5/2007 | Nakada | | E05F 15/695 49/350 |
| 2007/0138832 A1* | 6/2007 | Kraus | | B60J 1/17 296/155 |
| 2007/0236161 A1* | 10/2007 | Pebre | | H02H 7/0851 318/469 |
| 2008/0036406 A1* | 2/2008 | Kawai | | E05F 15/695 318/283 |
| 2009/0058340 A1* | 3/2009 | Sakai | | G05B 9/02 318/434 |
| 2009/0218978 A1* | 9/2009 | Kato | | B60J 1/17 318/478 |
| 2009/0295556 A1* | 12/2009 | Inoue | | E05F 15/46 340/438 |
| 2012/0192489 A1* | 8/2012 | Pribisic | | E05F 15/46 49/28 |
| 2013/0106435 A1* | 5/2013 | Mori | | E05F 15/41 324/612 |
| 2013/0340341 A1* | 12/2013 | Shibata | | E05F 15/40 49/25 |
| 2014/0083011 A1* | 3/2014 | Sumiya | | E05F 15/40 49/28 |
| 2014/0109478 A1* | 4/2014 | Mori | | E05F 15/695 49/26 |
| 2016/0222711 A1* | 8/2016 | Aoshima | | E05F 15/40 |

* cited by examiner

CONTROLLER FOR OPENING AND CLOSING MEMBER

CROSS REFERENCE TO RELATED APPLICATION

This application is based on Japanese Patent Application No. 2014-177091 filed on Sep. 1, 2014, the disclosure of which is incorporated herein by reference.

TECHNICAL FIELD

The present disclosure relates to a controller for an opening and closing member which can detect a pinching or involvement of a foreign matter generated due to the opening and closing member.

BACKGROUND

It is known that a determination of an existence of a foreign matter pinched between an opening and closing member and a peripheral member of the opening and closing member is executed in a case where an opening and closing operation of the opening and closing member provided in a door of a vehicle is executed. In this case, the opening and closing member is a window glass. Usually, when a controller for the opening and closing member determines that the foreign matter exists, the controller for the opening and closing member interrupts an opening and closing operation of the opening and closing member and executes another operation that is different from the opening and closing operation to release the foreign matter. Further, for example, the controller for the opening and closing member sets a threshold of a detection value varying according to a load of the window glass and compares the threshold with the detection value to determine whether the foreign matter exists. In this case, for example, the detection value is a rotational speed of a motor rotating to execute the opening and closing operation of the window glass.

However, when an external disturb is generated in a moving of the opening and closing member, the controller for the opening and closing member may erroneously determine that the foreign matter exists without respect to an existence of the foreign matter. In this case, for example, when the door is closed, the controller for the opening and closing member may erroneously determine that the foreign matter exists due to the external disturb generated in a moving of the opening and closing member. JP 2009-74356 A discloses a technology which is developed to avoid the above erroneous determination. According to JP 2009-74356 A, the opening and closing controller corrects the threshold of when the existence of the foreign matter is determined, based on an opening and closing state of the door. Therefore, the erroneous determination can be effectively prevented by considering an error generated due to the opening and closing state of the door.

SUMMARY

However, when a correction of the threshold is executed by the opening and closing controller in JP 2009-74356 A based on the opening and closing state of the door, a sensitivity of the existence of the foreign matter is changed. According to JP 2009-74356 A, when the door is in an opening state, the opening and closing controller corrects the threshold so as to increase the threshold. Therefore, when the existence of the foreign matter is determined to be true in a case where the door is in the opening state, it is necessary that the load applied to the opening and closing member is greater than the load of when the existence of the foreign matter is determined to be true in a usual case. Thus, a proper determination of the existence of the foreign matter cannot be obtained, and the opening and closing operation of the opening and closing member may be improperly controlled.

The present disclosure is made in view of the above matters, and it is an object of the present disclosure to provide a controller for an opening and closing member which can properly control an opening and closing operation of the opening and closing member according to an opening and closing state of a door.

According to an aspect of the present disclosure, the controller for the opening and closing member includes a driving mechanism executing an opening and closing operation of the opening and closing member mounted to a door of a vehicle wherein the opening and closing operation includes an opening operation and a closing operation, a detection portion detecting an opening and closing state of the door including an opening state and a closing state, a control portion executing a first operation of the driving mechanism in a case where the opening operation of the opening and closing member is executed and executing a second operation of the driving mechanism in a case where the closing operation of the opening and closing member is executed, and a determination portion determining an existence of a foreign matter pinched between the opening and closing member and a peripheral member located around the opening and closing member. When the determination portion determines that the foreign matter exists in a period where the driving mechanism is operating, the control portion executes an interrupt operation to interrupt an operation of the driving mechanism. When the detection portion detects that the door is changed from the opening state to the closing state in a period from a time point before the determination portion determines that the foreign matter exists to a time point after the determination portion determines that the foreign matter exists, the control portion executes a restart operation to restart one of the first operation and the second operation that is the operation of the driving mechanism executed right before the interrupt operation.

According to the above controller for the opening and closing member, when the controller for the opening and closing member determines that the foreign matter exists in the opening and closing operation of the opening and closing member, the controller for the opening and closing member temporarily stops the opening and closing operation. In this case, when the opening and closing member determines that the door is changed from the closed state to the open state in a period from a time point before the determination portion determines that the foreign matter exists to a time point after the determination portion determines that the foreign matter exists, the controller for the opening and closing member cancels a determination result that the foreign matter exists. Further, the controller for the opening and closing member restarts the opening and closing operation of the opening and closing member that is temporarily stopped after cancelling the determination result. According to the above configuration, an erroneous determination relative to the existence of the foreign matter is prevented without lowering a sensitivity relative to the existence of the foreign matter and particularly without lowering a sensitivity relative to the open state of the door. As a result, a sensitivity relative to the existence of the foreign matter can be maintained to be normal, a control based on the erroneous determination can be prevented, and the opening and closing operation of the opening and closing member can be properly controlled.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereafter, an embodiment of the present disclosure will be described. Further, the embodiment is an example provided to describe the present disclosure, and does not limit the present disclosure to the embodiment. In other words, the embodiment may be modified or changed within the scope of the present disclosure.

Figure 1:
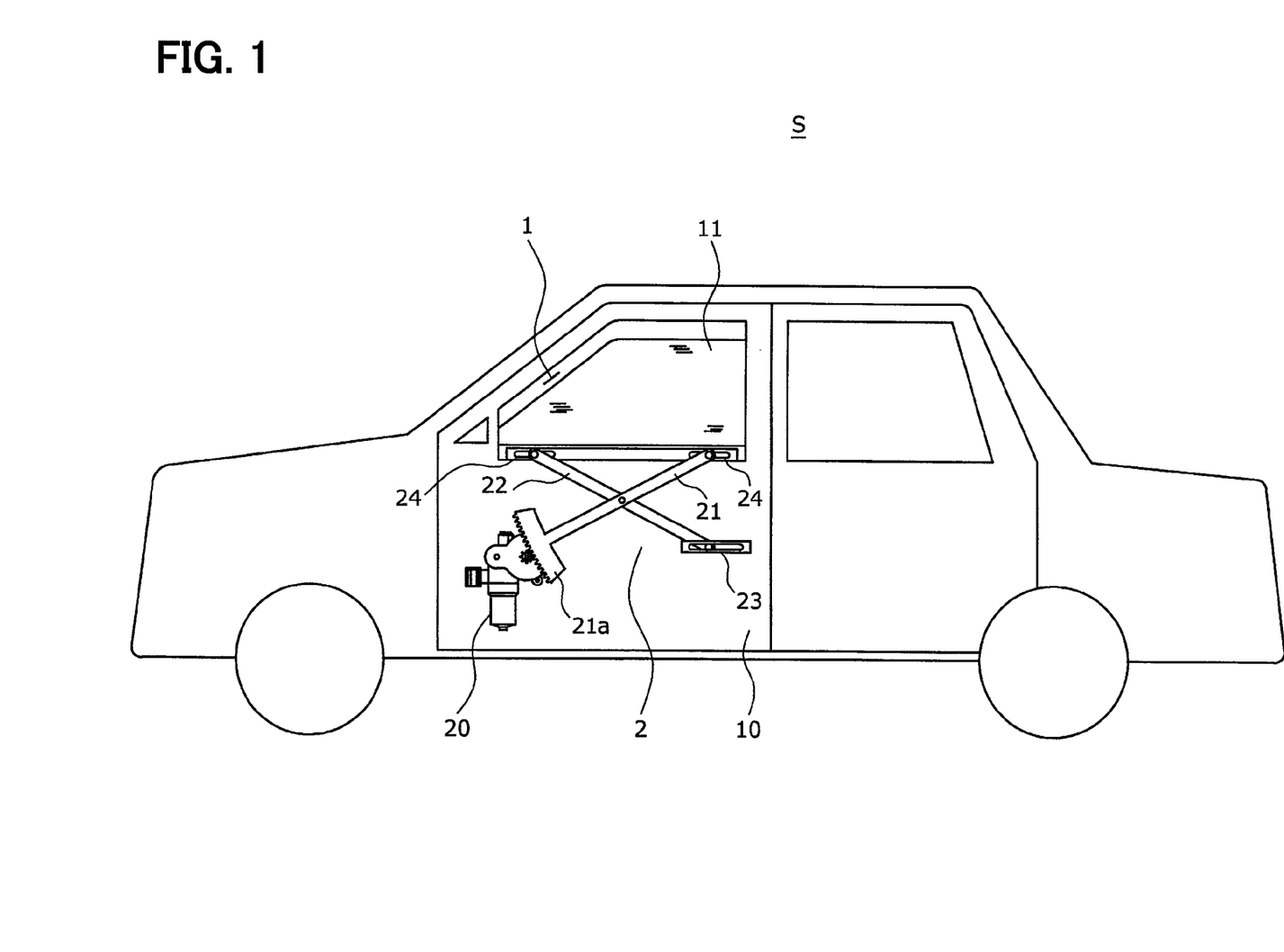
FIG. 1 is a diagram showing a mechanical configuration of a controller for an opening and closing member according to an embodiment of the present disclosure.

A controller for an opening and closing member according to the present embodiment is a power window device 1 mounted to a vehicle S. FIG. 1 is a diagram showing a mechanical configuration of the power window device 1 according to the present embodiment.

Figure 2:
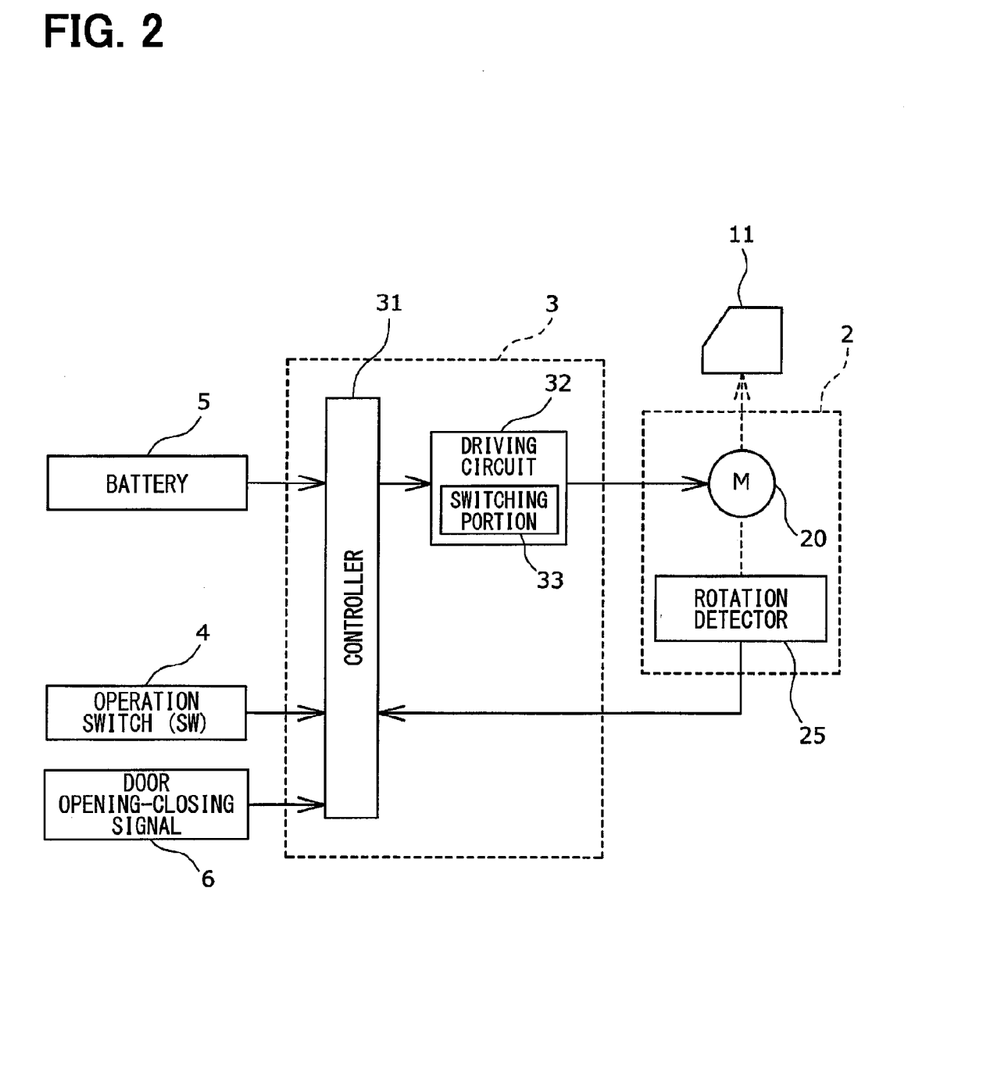
FIG. 2 is a diagram showing an electrical configuration of the controller for the opening and closing member according to the embodiment.

The power window device 1 raises or lowers (opens or closes) a window glass 11 by utilizing a rotational drive of a motor 20. The window glass 11 is mounted to a door 10 of the vehicle S and is the opening and closing member. The power window device 1 includes a lifting mechanism 2 that is a driving mechanism executing an opening and closing operation of the window glass 11. The opening and closing operation includes an opening operation and a closing operation. In the opening operation, the window glass 11 is lowered. In the closing operation, the window glass 11 is raised. As shown in FIG. 2, the power window device 1 further includes a control unit 3 controlling an operation of the lifting mechanism 2, and an operation switch 4 through which a passenger of the vehicle S sends an operation command.

The window glass 11 is raised or lowered between a fully closed position and a fully open position, along a rail which is not shown. The fully closed position is a top dead end, and the fully open position is a bottom dead end. The lifting mechanism 2 includes the motor 20 having a reduction mechanism fastened to the door 10, a lifting arm 21 having a gear 21a that is arc-shaped and is driven by the motor 20, a driven arm 22 pivoted on a point where the driven arm 22 crosses the lifting arm 21, a fixed channel 23 fastened to the door 10, and a glass-side channel 24 placed at a position downward of the window glass 11.

The motor 20 is rotational driven by a power supplied from the control unit 3, and rotates in a positive rotational direction or in a negative rotational direction. When the motor 20 rotates, the lifting arm 21 and the driven arm 22 move in association with the motor 20, and end portions of the lifting arm 21 and the driven arm 22 are limited by the fixed channel 23 and the glass-side channel 24. In other words, the lifting arm 21 and the driven arm 22 are X linked and driven by the motor 20, and the lifting arm 21 and the driven arm 22 controls a raising operation or a lowering operation of the window glass 11.

The motor 20 is integrally bonded to a rotation detector 25. The rotation detector 25 includes a Hall-effect element, and transmits a pulse signal synchronous with a rotation of the motor 20 to the control unit 3. In this case, the pulse signal is a speed detecting signal or a rotational-speed signal. The pulse signal is outputted at a predetermined moving quantity of the window glass 11 or a predetermined rotational angle of the motor 20. In other words, the rotation detector 25 outputs a signal correlative to a moving quantity of the window glass 11 that is substantially in proportional to the rotational speed of the motor 20.

A driving circuit 32 includes a switching portion 33. The switching portion 33 is electrically connected with the motor 20, and switches a direction of a current flowing through the motor 20 by switching a polarity of the switching portion 33. Specifically, the switching portion 33 switches the direction of the current flowing through the motor 20 by a semiconductor element such as a relay or a transistor. In this case, the transistor may be a MOSFET. When the current flows in a positive direction, the motor 20 rotates in the positive rotational direction. When the current flows in a negative direction, the motor 20 rotates in the negative rotational direction.

The control unit 3 computes a lifting position of the window glass 11 based on the pulse signal. The control unit 3 also can compute the rotational speed of the motor 20 according to an interval of the pulse signal, and can compute a lifting speed of the window glass 11 correlative to the rotational speed. Specifically, the control unit 3 or a controller 31 detects a pulse edge that is a rising or a falling of the pulse signal, computes a rotational period that is the rotational speed of the motor 20 based on a pulse width that is an interval of the pulse edge, and detects a rotational direction of the motor 20 based on phase differences between the pulse signals.

The control unit 3 indirectly computes a moving speed of the window glass 11 based on the rotational period that is the rotational speed of the motor 20, and specifies a moving direction of the window glass 11 based on the rotational direction of the motor 20. The control unit 3 counts a pulse number of the pulse edges. The pulse number that is a pulse count value is added or subtracted according to the opening and closing operation of the window glass 11. The control unit 3 specifies an opening and closing position of the window glass 11 according to a magnitude of the pulse count value.

The control unit 3 includes the controller 31 and the driving circuit 32. The controller 31 includes a microcomputer which has a CPU, a memory such a ROM or RAM, an input circuit, and an output circuit. As shown in FIG. 2, a door opening-closing signal 6 is inputted to the controller 31. The door opening-closing signal 6 is a signal sent from a courtesy switch of the door 10. The controller 31 detects (determines) an opening and closing state of the door 10 based on the door opening-closing signal 6. The opening and closing state includes an opening state and a closing state. In other words, the controller 31 functions as a detection portion detecting the opening and closing state of the door 10.

The controller 31 and the driving circuit 32 function as a control portion, and execute the opening and closing operation of the window glass 11 according to an operation signal of the operation switch 4. Specifically, according to the present embodiment, the operation switch 4 is a slide switch that can slide to two levels, and includes an opening switch, a closing switch, and an automatic switch. When the passenger controls the operation switch 4, a command signal controlling to open or close the window glass 11 is transmitted to the controller 31. When a first end of the operation switch 4 is moved by one level, the opening switch is turned on, and a common opening command signal executing a common opening operation of the window glass 11 is outputted. In the common opening operation, the window glass 11 is continuously moved to be open in a period where the first end of the operation switch 4 is continuously moved by one level. In a period where the controller 31 continuously receives the common opening command signal, the controller 31 executes a lowering operation of the lifting mechanism 2 by controlling the motor 20 to rotate in the positive rotational direction, and executes the common opening operation of the window glass 11. According to the present embodiment, the lowering operation of the lifting mechanism 2 corresponds to a DOWN operation shown in FIG. 7.

When a second end of the operation switch 4 is moved by one level, the closing switch is turned on, and a common closing command signal executing a common closing operation of the window glass 11 is outputted. In the common closing operation, the closing operation of the window glass 11 is continuously executed in a period where the second end of the operation switch 4 is continuously moved by one level. In a period where the controller 31 continuously receives the common closing command signal, the controller 31 executes a raising operation of the lifting mechanism 2 by controlling the motor 20 to rotate in the negative rotational direction, and executes the common closing operation of the window glass 11. According to the present disclosure, the raising operation of the lifting mechanism 2 corresponds to an UP operation shown in FIG. 4.

When the first end of the operation switch 4 is moved by two levels, both the opening switch and the automatic switch are turned on, and an automatic opening command signal executing an automatic opening operation of the window glass 11 is outputted. In the automatic opening operation, the window glass 11 is continuously moved to be open until the window glass 11 reaches the fully open position, without respect to an operation of the first end of the operation switch 4. When the controller 31 receives the automatic opening command signal, the controller 31 executes a continuous lowering operation of the lifting mechanism 2 by controlling the motor 20 to rotate in the positive rotational direction until the window glass 11 reaches the fully open position. In this case, the continuous lowering operation is a first operation. According to the present embodiment, the continuous lowering operation is the lowering operation that is continuously executed for a specified time period. In this case, the specified time period is a period from a time point that the controller 31 receives the automatic opening command signal from the operation switch 4 to a time point that the window glass 11 reaches the fully open position.

When the second end of the operation switch 4 is moved by two levels, both the closing switch and the automatic switch are turned on, and an automatic closing command signal executing an automatic closing operation of the window glass 11 is outputted. In the automatic closing operation, the closing operation of the window glass 11 is continuously executed until the window glass 11 reaches the fully closed position, without respect to an operation of the second end of the operation switch 4. When the controller 31 receives the automatic closing command signal, the controller 31 executes a continuous raising operation of the lifting mechanism 2 by controlling the motor 20 to rotate in the negative rotational direction until the window glass 11 reaches the fully closed position. In this case, the continuous raising operation is a second operation. According to the present embodiment, the continuous raising operation is the raising operation that is continuously executed for a specified time period. In this case, the specified time period is a period from a time point that the controller 31 receives the automatic closing command signal from the operation switch 4 to a time point that the window glass 11 reaches the fully closed position.

The controller 31 and the rotation detector 25 cooperate with each other and function as a determination portion, and determine an existence of a foreign matter pinched between the window glass 11 and a peripheral member of the window glass 11. Specifically, when the controller 31 receives the pulse signal from the rotation detector 25, the controller 31 determines whether the foreign matter exists between the window glass 11 and a window frame based on the pulse signal. According to the present embodiment, the peripheral member is a member located around the window glass 11 in the door 10, and is the window frame.

When the closing operation of the window glass 11 is executed, the existence of the foreign matter is determined according to an existence of a pinching of the foreign matter between a top end portion of the window glass 11 and the window frame. Specifically, when the pinching of the foreign matter between the top end portion of the window glass 11 and the window frame exists, it is determined that the foreign matter exists. When the pinching of the foreign matter is generated, the moving speed of the window glass 11 and the rotational speed of the motor 20 are reduced, and the rotational period becomes longer. In a period where the controller 31 executes the closing operation of the window glass 11, the controller 31 monitors the rotational speed of the motor 20 in the closing operation based on the pulse signal. The controller 31 detects a start of the pinching at a time point that the rotational speed of the motor 20 in the closing operation starts to be reduced, and determines that the pinching exists at a time point that the rotational speed is reduced to a threshold that is previously established. In this case, the threshold is a pinching determination threshold.

When the opening operation of the window glass 11 is executed, the existence of the foreign matter is determined according to an existence of an involvement of the foreign matter between the window glass 11 that is being lowered and the window frame. In other words, the existence of the foreign matter is determined according to the involvement of the foreign matter. Specifically, when the involvement of the foreign matter between the window glass 11 that is being lowered and the window frame exists, it is determined that the foreign matter exists. The existence of the involvement is determined in the same manner as the existence of the pinching. Specifically, the controller 31 detects a start of the involvement at a time point that the rotational speed of the motor 20 in the opening operation starts to be reduced, and determines that the involvement exists at a time point that the rotational speed is reduced to a threshold that is previously established. In this case, the threshold is an involvement determination threshold.

When the controller 31 determines that the pinching or the involvement exists in a period where the controller 31 executes the opening and closing operation of the window glass 11, the controller 31 executes an interrupt operation interrupting an operation of the lifting mechanism 2. In this case, the operation of the lifting mechanism 2 includes the lowering operation, the raising operation, the continuous lowering operation, and the continuous raising operation. According to the present embodiment, in a period where the controller 31 executes the opening and closing operation of the window glass 11, the controller 31 executes the operation of the lifting mechanism 2. When the controller 31 determines that the pinching exists in a period where the automatic closing operation of the window glass 11 is executed, the controller 31 executes the interrupt operation to interrupt the continuous raising operation of the lifting mechanism 2. When the controller 31 determines that the involvement exists in a period where the automatic opening operation of the window glass 11 is executed, the controller 31 executes the interrupt operation to interrupt the continuous lowering operation of the lifting mechanism 2.

When the controller 31 detects that the door 10 is changed from the opening state to the closing state in a period from a time point before the controller 31 determines that the pinching or the involvement exists to a time point after the controller 31 determines that the pinching or the involvement exists, the controller 31 executes a restart operation to restart the operation of the lifting mechanism 2 that is executed right before the interrupt operation. When the controller 31 executes the interrupt operation to interrupt the continuous raising operation of the lifting mechanism 2, and when the controller 31 detects that the door 10 is changed from the opening state to the closing state in a period from a time point before the controller 31 determines that the pinching exists to a time point after the controller 31 determines that pinching exists, the controller 31 executes the restart operation to restart the continuous raising operation of the lifting mechanism 2. When the controller 31 executes the interrupt operation to interrupt the continuous lowering operation of the lifting mechanism 2, and when the controller 31 detects that the door 10 is changed from the opening state to the closing state in a period from a time point before the controller 31 determines the involvement exists to a time point after the controller 31 determines that the involvement exists, the controller 31 executes the restart operation to restart the continuous lowering operation of the lifting mechanism 2.

According to the present embodiment, a time point before the controller 31 determines that the pinching or the involvement exists is a first time point Ts, Us, and the first time point Ts, Us is an optional time point in a period from a start time point of the pinching or the involvement to a time point that the controller 31 determines that the pinching or the involvement exists. Further, a time point after the controller 31 determines that the pinching or the involvement exists is a second time point Te, Ue, and the second time point Te, Ue is set to a time point that a predetermined time period has elapsed from a time point that the controller 31 determines that the pinching or the involvement exists. According to the present embodiment, the second time point Te, Ue is set to a time point that a protection time period of the switching portion 33 has elapsed from a time point that the controller 31 determines that the pinching or the involvement exists.

The controller 31 executes the interrupt operation at a determination time point Td, Ud that is a time point that the controller 31 determines that the pinching or the involvement exists. Thus, when the controller 31 detects that the door 10 is changed from the opening state to the closing state in a period from the first time point Ts, Us to the second time point Te, Ue, the controller 31 executes the restart operation at a time point that the protection time period of the switching portion 33 has elapsed from a time point that the controller 31 executes the interrupt operation.

When the controller 31 detects that the door 10 is not changed from the opening state to the closing state in a period from the first time point Ts, Us to the second time point Te, Ue, the controller 31 executes a foreign-matter releasing operation. In the foreign-matter releasing operation, the controller 31 executes an operation that is different from the operation of the lifting mechanism 2 that is executed right before the interrupt operation. Specifically, when the controller 31 executes the interrupt operation to interrupt the continuous lowering operation, the controller 31 executes the raising operation of the lifting mechanism 2 to execute the closing operation of the window glass 11 by a predetermined quantity, in the foreign-matter releasing operation after executing the interrupt operation. When the controller 31 executes the interrupt operation to interrupt the continuous raising operation, the controller 31 executes the lowering operation of the lifting mechanism 2 to execute the opening operation of the window glass 11 by a predetermined quantity, in the foreign-matter releasing operation after executing the interrupt operation.

According to the present embodiment, the power window device 1 can properly determine the existence of the pinching or the existence of the involvement by considering the opening and closing state of the door 10 without changing the threshold. Thus, the power window device 1 accurately controls the opening and closing operation of the window glass 11 by avoiding a control executed based on an erroneous determination.

Figure 3:
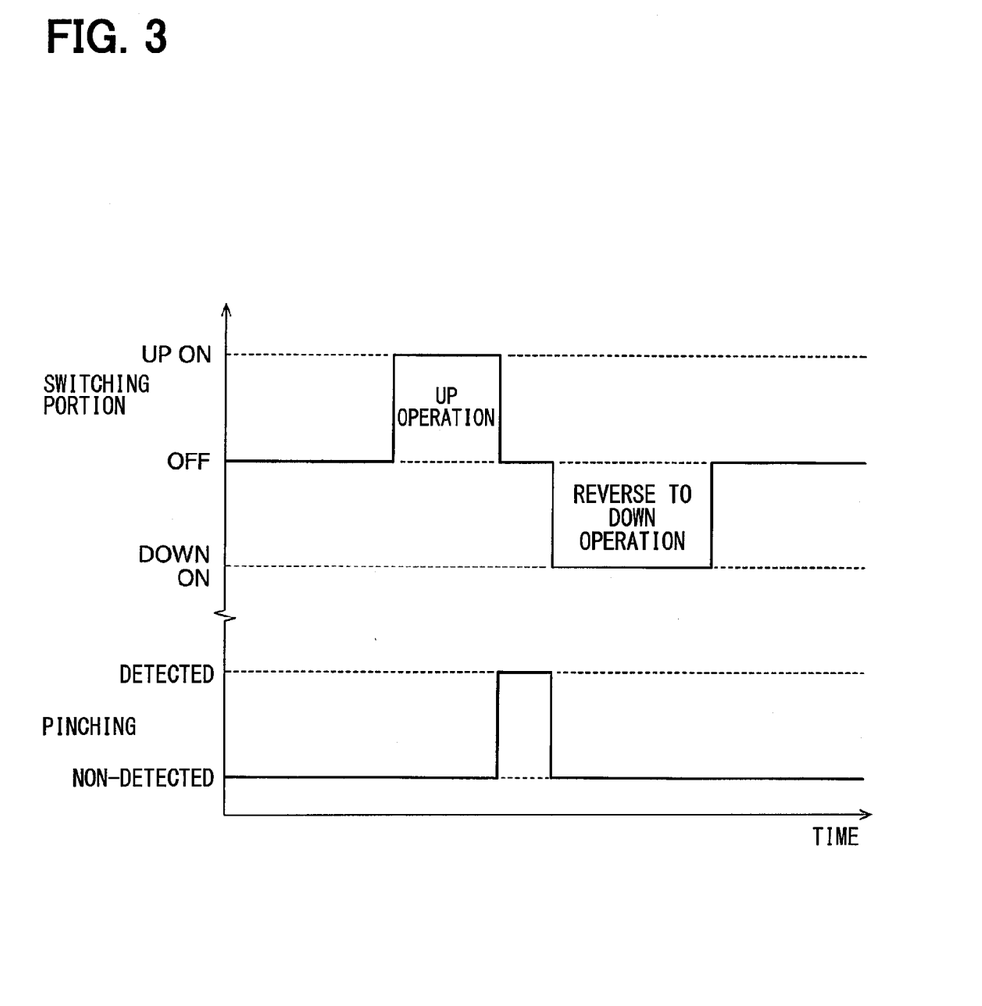
FIG. 3 is a diagram showing a closing operation of a controller for the opening and closing member according to a conventional example.

Specifically, when the door 10 is closed from the opening state in a period where the closing operation of the window glass 11 is executed, a power window device according to a conventional example erroneously determines that the pinching exists, due to a collision generated when the door 10 is closed as shown in FIG. 3. According to the present embodiment, in a period where the closing operation of the window glass 11 is executed, the raising operation of the lifting mechanism 2 is executed. FIG. 3 is a diagram showing a closing operation of the power window device according to the conventional example.

Further, when the power window device according to the conventional example erroneously determines that the pinching exists, the power window device turns off the switching portion 33, terminates the closing operation of the window glass 11, and then executes a foreign-matter releasing operation to execute the lowering operation of the lifting mechanism 2. Thus, even though the pinching does not exist, the opening operation of the window glass 11 is executed, and a switching operation executed by the passenger to fully close the window glass 11 is cancelled. In the switching operation executed to fully close the window glass 11 which is referred to as a fully-closed switching operation, the operation switch 4 is pressed, and the closing switch and the automatic switch are turned on.

Figure 4:
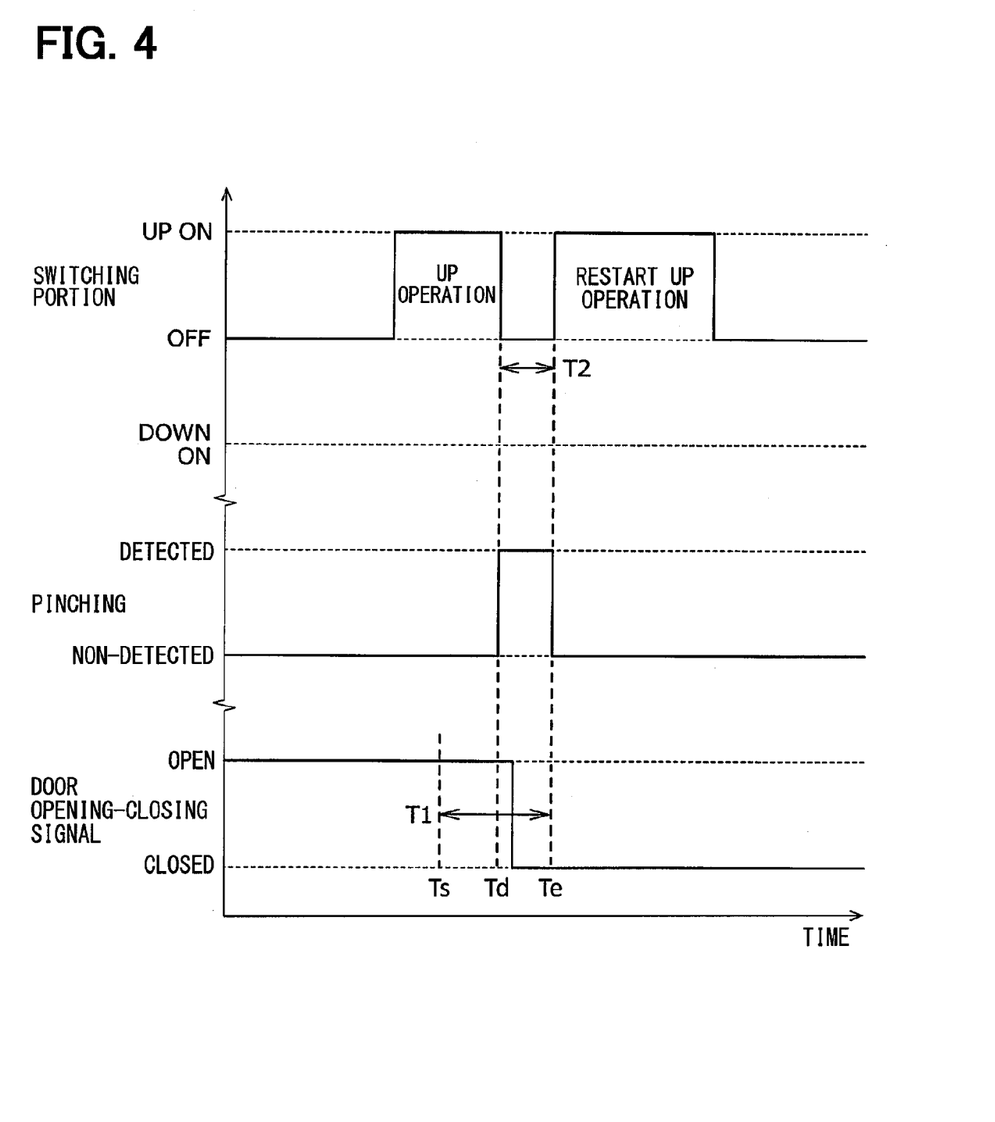
FIG. 4 is a diagram showing a closing operation of the controller for the opening and closing member according to the embodiment.

According to the present embodiment, as shown in FIG. 4, when the power window device 1 determines that the pinching exists in a period where the power window device 1 executes the closing operation of the window glass 11, the power window device 1 turns off the switching portion 33 and temporarily stops the closing operation of the window glass 11. In this case, the power window device 1 operates as the same as the power window device according to the conventional example. FIG. 4 is a diagram showing a closing operation of the power window device 1 according to the embodiment.

Then, the controller 31 determines whether the door 10 is changed from the opening state to the closing state in a determination period T1 from the first time point Ts to the second time point Te. When the controller 31 determines that the door 10 is changed from the opening state to the closing state in the determination period T1, the controller 31 cancels a determination result that the pinching exists. Further, according to the present embodiment, as shown in FIG. 4, when the determination result that the pinching exists is cancelled, the operation of the window glass 11 executed right before the power window device 1 determines that the pinching exists is restarted. In this case, the closing operation of the window glass 11 is restarted. Since the closing operation of the window glass 11 which is temporarily stopped is restarted when the determination result that the pinching exists is cancelled, the fully-closed switching operation executed by the passenger is maintained to be in an active state. In other words, according to the present embodiment, it can be prevented that the switching operation executed by the passenger is cancelled based on the erroneous determination relative to the pinching, and a convenience of the power window device 1 is improved.

When the controller 31 determines that the door 10 is not changed from the opening state to the closing state in the determination period T1, a reliability of the determination result that the pinching exists is high, and the controller 31 uses the determination result that the pinching exists. Then, the controller 31 executes the foreign-matter releasing operation to execute the lowering operation of the lifting mechanism 2, and the foreign matter can be properly removed.

As the above description, according to the present embodiment, it can be prevented that a control is executed based on the erroneous determination obtained due to the collision of a closing operation of the door 10. In other words, it can be prevented that the foreign-matter releasing operation is executed in a case where the foreign matter does not exist. According to the present embodiment, since the pinching determination threshold is not changed according to the opening and closing state of the door 10, the sensitivity of the existence of the foreign matter can be maintained to be normal. Thus, the power window device 1 according to the present embodiment properly controls the opening and closing operation of the window glass 11.

As shown in FIG. 4, the second time point Te that is the end time point of the determination period T1 is set to a time point that the protection time period of the switching portion 33 has elapsed from the determination time point Td. In other words, when the controller 31 determines that the door 10 is changed from the opening state to the closing state, the controller 31 executes the restart operation at a time point that the protection time period of the switching portion 33 has elapsed from a time point that the controller 31 executes the interrupt operation to interrupt the operation of the lifting mechanism 2. Thus, the power window device 1 prevents a malfunction of a member constituting the switching portion 33, and properly controls an interrupt and a restart of the opening and closing operation of the window glass 11. In this case, the member is a relay or a transistor, and the transistor may be a MOSFET. Further, the protection time period is a time period T2 shown in FIG. 4.

Figure 5:
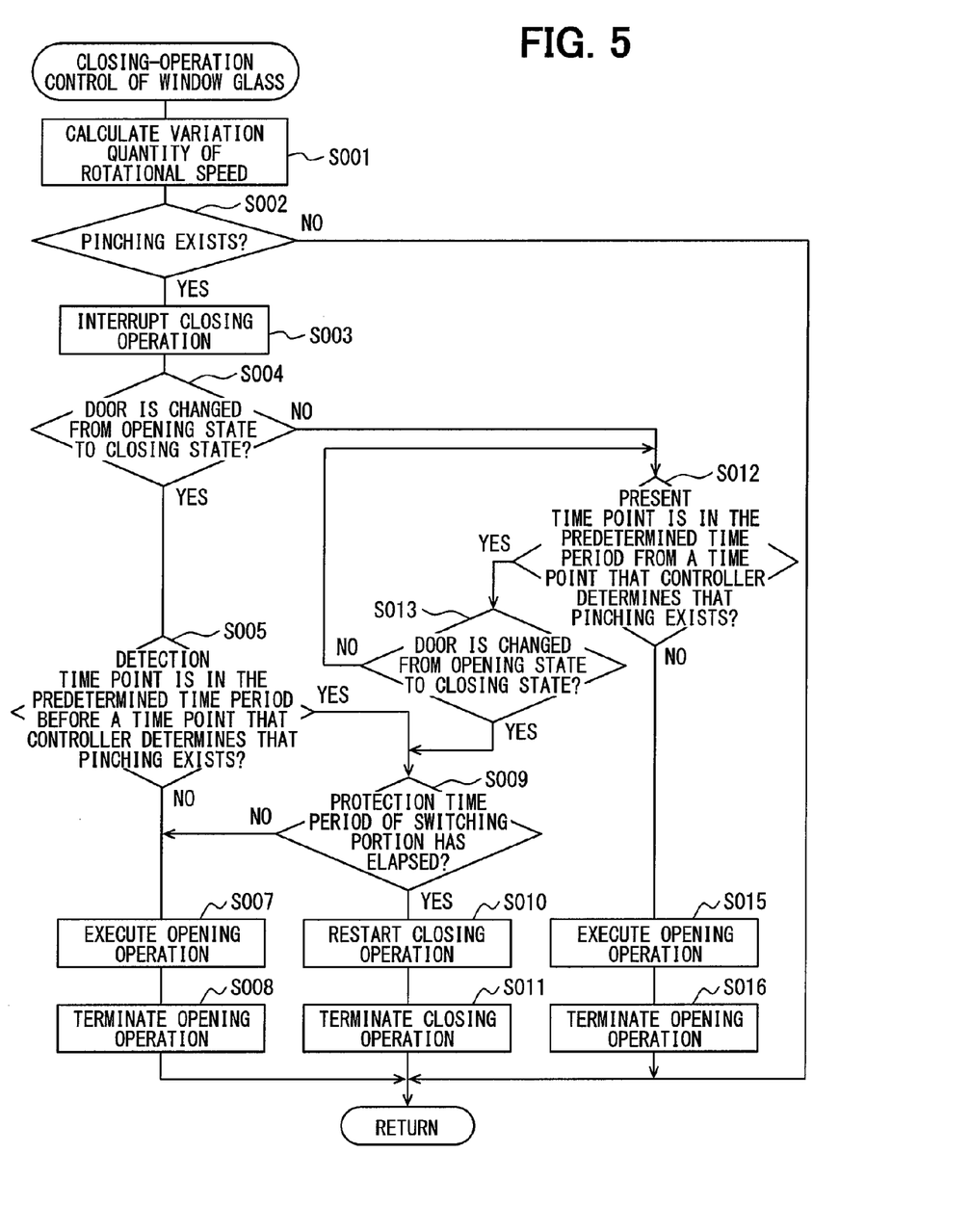
FIG. 5 is a flowchart showing a closing-operation control according to the embodiment.

Next, referring to FIG. 5, a control flow of the power window device 1 according to the present embodiment will be described. FIG. 5 is a flowchart showing an opening and closing member control that is an automatic opening and closing control of the pinching of the window glass 11. Hereafter, a closing-operation control controlling the closing operation in the opening and closing operation of the window glass 11 will be described.

The closing-operation control of the window glass 11 is started by a trigger that the passenger executes a switch operation to execute the closing operation of the window glass 11 by utilizing the operation switch 4. Hereafter, the closing-operation control is executed in a case where the fully-closed switching operation is executed. In the closing-operation control of the window glass 11, firstly, the controller 31 calculates the rotational speed of the motor 20 based on the pulse signal outputted from the rotation detector 25, and calculates a variation quantity of the rotational speed based on the rotational speed (S001). In addition, a method for calculating the variation quantity of the rotational speed of the motor 20 may be a well-known method. For example, a calculation method in JP 2009-74356 A may be used.

Next, the controller 31 determines whether the pinching exists based on the variation quantity of the rotational speed which is calculated at S001 (S002). When the controller 31 determines that the pinching does not exist (S002: No), the controller 31 continuously executes the closing operation of the window glass 11 until the window glass 11 reaches the fully closed position. In other words, in this case, the controller 31 executes the continuous raising operation of the lifting mechanism 2.

When the controller 31 determines that the pinching exists (S002: Yes), the controller 31 executes the interrupt operation to interrupt the closing operation of the window glass 11 (S003). The controller 31 determines whether it is detected that the door 10 is changed from the opening state to the closing state before a time point that the controller 31 determines that the pinching exists (S004). When the controller 31 determines that a change of the door 10 is detected (S004: Yes), the controller 31 determines whether a detection time point that the controller 31 determines that the change of the door 10 is detected is in the predetermined time period before a time point that the controller 31 determines that the pinching exists (S005). In this case, the detection time point is referred to as a door-closing detection time point.

When the controller 31 determines that the door-closing detection time point is not in the predetermined time period before a time point that the controller 31 determines that the pinching exists (S005: No), the controller 31 executes the opening operation to open the window glass 11 (S007). In this case, the opening operation is the foreign-matter releasing operation. In the opening operation, the lowering operation of the lifting mechanism 2 is executed. The controller 31 terminates the opening operation of the window glass 11 at a time point that the window glass 11 is lowered by a predetermined quantity (S008).

When the controller 31 determines that the door-closing detection time point is in the predetermined time period before a time point that the controller 31 determines that the pinching exists (S005: Yes), and when the controller 31 determines that a condition that the protection time period of the switching portion 33 has elapsed from a time point that the controller 31 executes the interrupt operation is met (S009), the controller 31 executes the restart operation to restart the closing operation of the window glass 11 (S010). When the window glass 11 reaches the fully closed position after the controller 31 executes the restart operation to restart the closing operation of the window glass 11, the controller 31 terminates the closing operation (S011).

When the controller 31 determines that the change of the door 10 is not detected before a time point that the controller 31 determines that the pinching exists (S004: No), the controller 31 determines whether a present time point is in the predetermined time period from a time point that the controller 31 determines that the pinching exists (S012). Specifically, when the controller 31 determines that the present time point is in the predetermined time period from a time point that the controller 31 determines that the pinching exists (S012: Yes), and when the controller 31 determines that the change of the door 10 is detected (S013), the controller 31 executes operations from S009 to S011. In other words, when the controller 31 determines that a condition that the protection time period of the switching portion 33 has elapsed from a time point that the controller 31 executes the interrupt operation, the controller 31 restarts the closing operation of the window glass 11. Then, when the window glass 11 reaches the fully closed position, the controller 31 terminates the closing operation.

When the controller 31 determines that the present time point is not in the predetermined time period after a time point that the controller 31 determines that the pinching exists (S012: No), the controller 31 executes the foreign-matter releasing operation that is an operation executing the opening operation of the window glass 11 (S015). When the window glass 11 is lowered by the predetermined quantity, the controller 31 terminates the opening operation of the window glass 11 (S016).

Since the above operations are repeated, the closing-operation control of the window glass 11 is properly executed. Specifically, a continuation of the opening operation, a termination of the opening operation, and a restart of the closing operation are properly controlled, according to the existence of the foreign matter.

Figure 6:
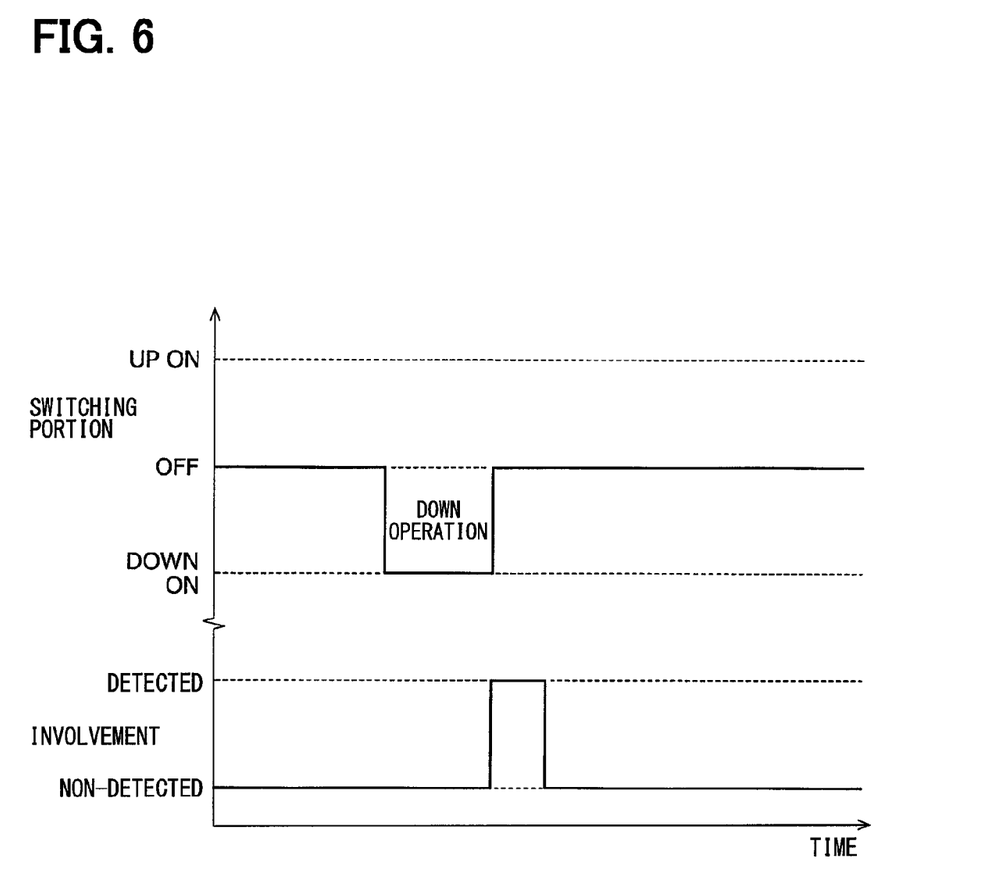
FIG. 6 is a diagram showing an opening operation of the controller for the opening and closing member according to the conventional example.

When the door 10 is closed from the opening state in a period where the opening operation of the window glass 11 is executed, the power window device according to the conventional example erroneously determines that the involvement exists, due to a collision generated when the door 10 is closed as shown in FIG. 6. According to the present embodiment, in a period where the opening operation of the window glass 11 is executed, the lowering operation of the lifting mechanism 2 is executed. FIG. 6 is a diagram showing an opening operation of the power window device according to the conventional example.

Further, when the power window device according to the conventional example erroneously determines that the involvement exists, the power window device turns off the switching portion 33, and terminates the opening operation of the window glass 11. Thus, even though the involvement does not exist, a switching operation executed by the passenger to fully open the window glass 11 is cancelled. In the switching operation executed to fully open the window glass 11 which is referred to as a fully-open switching operation, the operation switch 4 is pressed, and the opening switch and the automatic switch are turned on.

Figure 7:
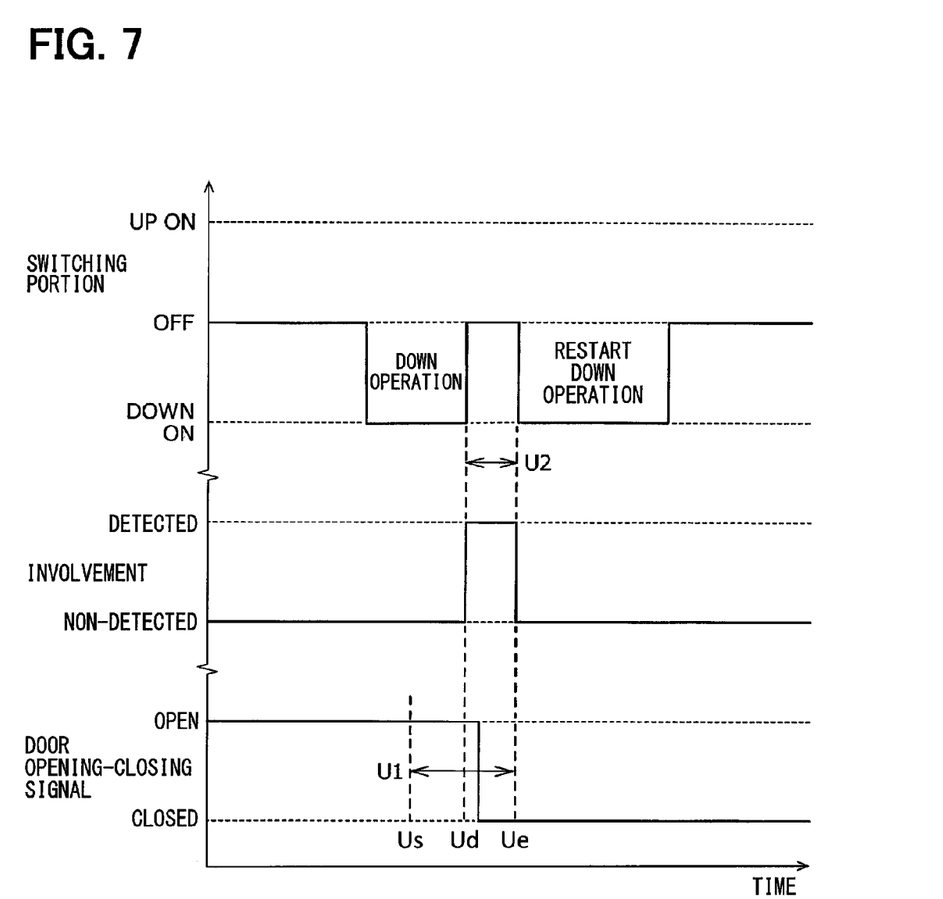
FIG. 7 is a diagram showing an opening operation of the controller for the opening and closing member according to the embodiment.

According to the present embodiment, as shown in FIG. 7, when the power window device 1 determines that the involvement exists in a period where the power window device 1 executes the opening operation of the window glass 11, the power window device 1 turns off the switching portion 33 and temporarily stops the opening operation of the window glass 11. In this case, the power window device 1 operates as the same as the power window device according to the conventional example. FIG. 7 is a diagram showing an opening operation of the power window device 1 according to the embodiment.

Then, the controller 31 determines whether the door 10 is changed from the opening state to the closing state in a determination period U1 from the first time point Us to the second time point Ue. When the controller 31 determines that the door 10 is changed from the opening state to the closing state in the determination period U1, the controller 31 cancels a determination result that the involvement exists. Further, according to the present embodiment, as shown in FIG. 7, when the determination result that the involvement exists is cancelled, the operation of the window glass 11 executed right before the power window device 1 determines that the involvement exists is restarted. In this case, the opening operation of the window glass 11 is restarted. Since the opening operation of the window glass 11 which is temporarily stopped is restarted when the determination result that the involvement exists is cancelled, the fully-open switching operation executed by the passenger is maintained to be in an active state. In other words, according to the present embodiment, it can be prevented that the switching operation executed by the passenger is cancelled based on the erroneous determination relative to the involvement, and the convenience of the power window device 1 is improved.

When the controller 31 determines that the door 10 is not changed from the opening state to the closing state in the determination period U1, the reliability of the determination result that the involvement exists is high, and the controller 31 uses the determination result that the involvement exists.

As the above description, according to the present embodiment, since the involvement determination threshold is not changed according to the opening and closing state of the door 10, the sensitivity of the existence of the foreign matter can be maintained to be normal. Thus, the power window device 1 according to the present embodiment properly controls the opening and closing operation of the window glass 11.

As shown in FIG. 7, the second time point Ue that is the end time point of the determination period U1 is set to a time point that the protection time period of the switching portion 33 has elapsed from the determination time point Ud. In other words, when the controller 31 determines that the door 10 is changed from the opening state to the closing state, the controller 31 executes the restart operation at a time point that the protection time period of the switching portion 33 has elapsed from a time point that the controller 31 executes the interrupt operation to interrupt the operation of the lifting mechanism 2. Thus, the power window device 1 prevents a malfunction of a member constituting the switching portion 33, and properly controls an interrupt and a restart of the opening and closing operation of the window glass 11. In this case, the member is a relay or a transistor, and the transistor may be a MOSFET. Further, the protection time period is a time period U2 shown in FIG. 7. In addition, the foreign-matter releasing operation releasing the involvement of the foreign matter as the same as the pinching may be executed, after the involvement is determined or detected.

Figure 8:
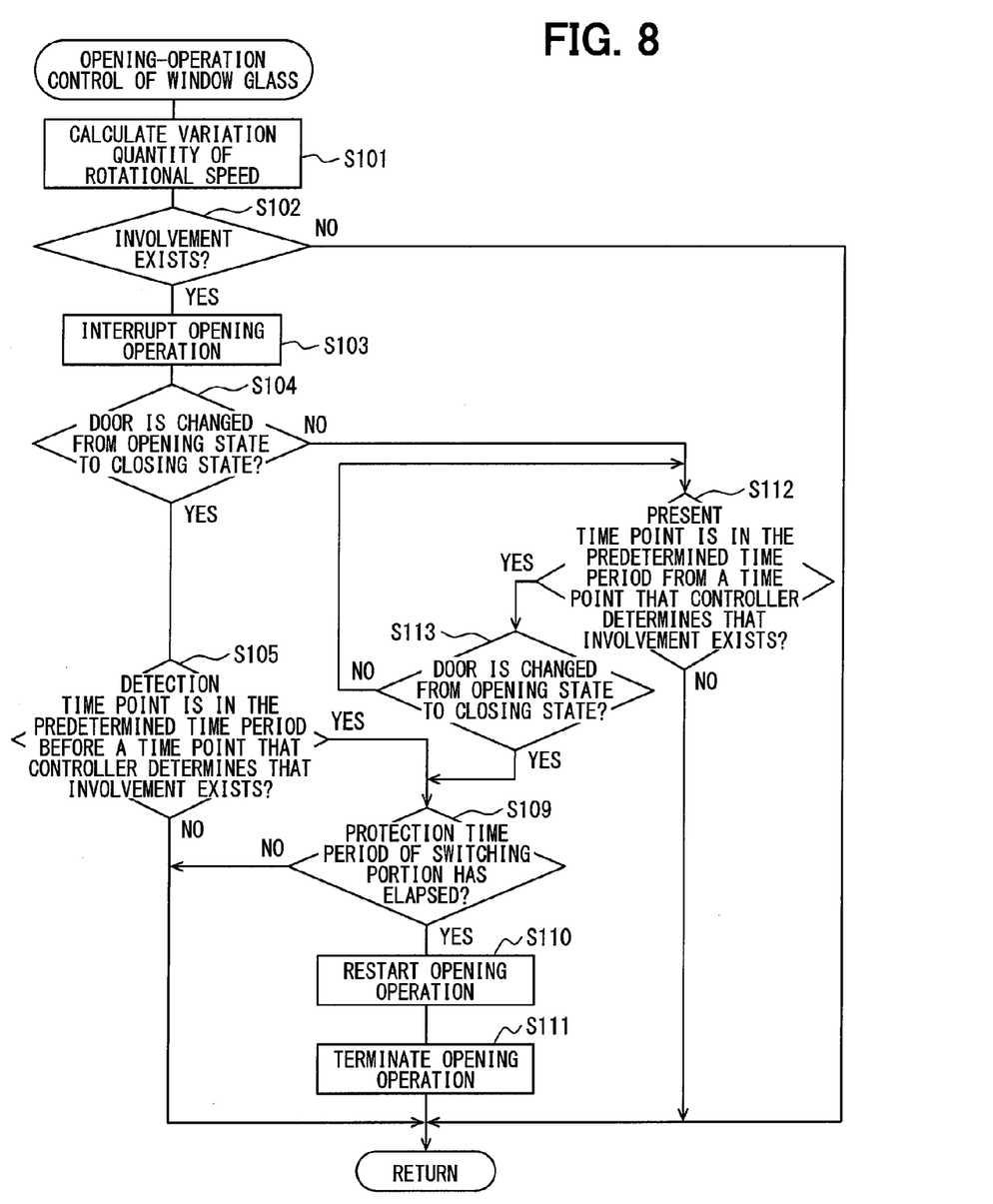
FIG. 8 is a flowchart showing an opening-operation control according to the embodiment.

Next, referring to FIG. 8, a control flow of the power window device 1 according to the present embodiment will be described. FIG. 8 is a flowchart showing the opening and closing member control that is an automatic opening and closing control of the involvement of the window glass 11. Hereafter, an opening-operation control controlling the opening operation in the opening and closing operation of the window glass 11 will be described.

The opening-operation control of the window glass 11 is started by a trigger that the passenger executes a switch operation to execute the opening operation of the window glass 11 by utilizing the operation switch 4. Hereafter, the opening-operation control is executed in a case where the fully-open switching operation is executed. In the opening-operation control of the window glass 11, firstly, the controller 31 calculates the rotational speed of the motor 20 based on the pulse signal outputted from the rotation detector 25, and calculates the variation quantity of the rotational speed based on the rotational speed (S101). In addition, a method for calculating the variation quantity of the rotational speed of the motor 20 may be a well-known method. For example, a calculation method in JP 2009-74356 A may be used.

Next, the controller 31 determines whether the involvement exists based on the variation quantity of the rotational speed which is calculated at S101 (S102). When the controller 31 determines that the involvement does not exist (S102: No), the controller 31 continuously executes the opening operation of the window glass 11 until the window glass 11 reaches the fully open position. In other words, in this case, the controller 31 executes the continuous lowering operation of the lifting mechanism 2.

When the controller 31 determines that the involvement exists (S102: Yes), the controller 31 executes the interrupt operation to interrupt the opening operation of the window glass 11 (S103). The controller 31 determines whether it is detected that the door 10 is changed from the opening state to the closing state before a time point that the controller 31 determines that the involvement exists (S104). When the controller 31 determines that a change of the door 10 is detected (S104: Yes), the controller 31 determines whether a detection time point that the controller 31 determines that the change of the door 10 is detected is in the predetermined time period before a time point that the controller 31 determines that the involvement exists (S105). In this case, the detection time point is referred to as a door-closing detection time point.

When the controller 31 determines that the door-closing detection time point is not in the predetermined time period before a time point that the controller 31 determines that the involvement exists (S105: No), the controller 31 terminates the present opening-operation control.

When the controller 31 determines that the door-closing detection time point is in the predetermined time period before a time point that the controller 31 determines that the involvement exists (S105: Yes), and when the controller 31 determines that a condition that the protection time period of the switching portion 33 has elapsed from a time point that the controller 31 executes the interrupt operation is met (S109), the controller 31 executes the restart operation to restart the opening operation of the window glass 11 (S110). When the window glass 11 reaches the fully open position after the controller executes the restart operation to restart the opening operation of the window glass 11, the controller 31 terminates the opening operation (S111).

When the controller 31 determines that the change of the door 10 is not detected before a time point that the controller 31 determines that the involvement exists (S104: No), the controller 31 determines whether a present time point is in the predetermined time period from a time point that the controller 31 determines that the involvement exists (S112). Specifically, when the controller 31 determines that the present time point is in the predetermined time period from a time point that the controller 31 determines that the involvement exists (S112: Yes), and when the controller 31 determines that the change of the door 10 is detected (S113), the controller 31 executes operations from S109 to S111. In other words, when the controller 31 determines that a condition that the protection time period of the switching portion 33 has elapsed from a time point that the controller 31 executes the interrupt operation, the controller 31 restarts the opening operation of the window glass 11. Then, when the window glass 11 reaches the fully open position, the controller 31 terminates the opening operation.

When the controller 31 determines that the present time point is not in the predetermined time period after a time point that the controller 31 determines that the involvement exists (S112: No), the controller 31 terminates the present opening-operation control.

Since the above operations are repeated, the opening-operation control of the window glass 11 is properly executed. Specifically, a restart of the opening operation is properly controlled, according to the existence of the foreign matter.

According to the present embodiment, in the controller for the opening and closing member, when the determination portion determines that the foreign matter exists in a period where the driving mechanism is operating, the control portion executes the interrupt operation. When the detection portion detects that the door is not changed from the opening state to the closing state in a period, the control portion executes the foreign-matter releasing operation to execute one of the first operation and the second operation that is different from the operation of the driving mechanism executed right before the interrupt operation.

According to the above configuration, when the foreign matter is determined to exist, and when the detection portion detects that the door is not changed from the opening state to the closing state, the control portion controls the driving mechanism to execute an operation different from the operation right before the interrupt operation. In other words, since the closing operation of the door does not affect the determination result when the closing operation of the door is not executed, the reliability of the determination result becomes higher. In this case, when the control portion executes the foreign-matter releasing operation depending on the determination result, the foreign matter pinched between the opening and closing member and a peripheral member of the opening and closing member can be properly removed.

According to the present embodiment, in the controller for the opening and closing member, when the detection portion detects that the door is changed from the opening state to the closing state in a period from a time point before the determination portion determines that the foreign matter exists to a time point after the determination portion determines that the foreign matter exists, the control portion executes the restart operation at a time point that the predetermined time period has elapsed from a time point that the control portion executes the interrupt operation.

According to the above configuration, when the detection portion detects that the door is changed from the opening state to the closing state in a period from a time point before the determination portion determines that the foreign matter exists to a time point after the determination portion determines that the foreign matter exists, the control portion executes the restart operation by a trigger that the predetermined time period has elapsed from a time point that the control portion executes the interrupt operation. In other words, the operation of the opening and closing member executed right before the interrupt operation is restarted in a case where the predetermined time period has elapsed from a time point that the interrupt operation is executed. Thus, the convenience of the controller for the opening and closing member is improved.

According to the present embodiment, in the controller for the opening and closing member, the driving mechanism includes the motor. The controller for the opening and closing member further includes the switching portion electrically connected with the motor. When the detection portion detects that the door is changed from the opening state to the closing state in the period from a time point before the determination portion determines that the foreign matter exists to a time point after the determination portion determines that the foreign matter exists, the control portion executes the restart operation at a time point that the protection time period of the switching portion has elapsed from a time point that the control portion executes the interrupt operation.

According to the above configuration, when the detection portion detects that the door is changed from the opening state to the closing state in the period from a time point before the determination portion determines that the foreign matter exists to a time point after the determination portion determines that the foreign matter exists, the control portion executes the restart operation at a time point that the protection time period of the switching portion has elapsed from a time point that the control portion executes the interrupt operation. Thus, the switching portion can be protected, and an interrupt and a restart of the opening and closing operation of the opening and closing member can be properly controlled.

According to the present embodiment, in the controller for the opening and closing member, the opening and closing member is the window glass mounted to the door. The determination portion determines whether the pinching of the foreign matter is generated due to the window glass in the closing operation and determines whether the involvement of the foreign matter is generated due to the window glass in the opening operation.

According to the above configuration, the existence of the foreign matter is determined according to the existence of the pinching of the foreign matter in the window glass in the closing operation and the existence of the involvement of the foreign matter in the window glass in the opening operation. Thus, in the opening operation and the closing operation of the window glass, an operation control can be properly achieved by considering the determination of the existence of the foreign matter and the opening and closing state of the door.

According to the present embodiment, the controller for the opening and closing member can prevent from erroneously determining the existence of the foreign matter, without changing the sensitivity of the existence of the foreign matter according to the opening and closing state of the door. Thus, the controller for the opening and closing member can maintain the sensitivity of the existence of the foreign matter be normal, can prevent the control executed based on the erroneous determination, and can properly control the opening and closing operation of the opening and closing member.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A controller for an opening and closing member comprising:
    a driving mechanism executing an opening and closing operation of the opening and closing member mounted to a door of a vehicle, the opening and closing operation including an opening operation and a closing operation,
    a detection portion including a microprocessor, the detecting portion detecting an opening and closing state of the door, the opening and closing state including an opening state and a closing state;
    a control portion including the microprocessor, the control portion executing a first operation of the driving mechanism in a case where the opening operation of the opening and closing member is executed, and executing a second operation of the driving mechanism in a case where the closing operation of the opening and closing member is executed; and
    a determination portion including the microprocessor and a detector, the determination portion determining an existence of a pinching of a foreign matter between the opening and closing member and a peripheral member, the peripheral member being located around the opening and closing member, wherein
    when the determination portion determines that the foreign matter exists in a period where the driving mechanism is operating, the control portion executes an interrupt operation to interrupt an operation of the driving mechanism, and
    when the detection portion detects that the door is changed between the opening state and the closing state in a period from a time point before the determination portion determines that the foreign matter exists to a time point after the determination portion determines that the foreign matter exists, the control portion executes a restart operation to restart one of the first operation and the second operation that is the operation of the driving mechanism executed immediately before the interrupt operation.

2. The controller for the opening and closing member according to claim 1, wherein
    when the determination portion determines that the foreign matter exists in a period where the driving mechanism is operating, the control portion executes the interrupt operation, and
    when the detection portion detects that the door is not changed from the opening state to the closing state in the period, the control portion executes a foreign-matter releasing operation to execute one of the first operation and the second operation that is different from the operation of the driving mechanism executed right before the interrupt operation.

3. The controller for the opening and closing member according to claim 1, wherein
    when the determination portion determines that the foreign matter exists in a period where the driving mechanism is operating, the control portion executes the interrupt operation, and when the detection portion detects a change between the that the door is not changed from the opening state to the closing state in the period, the control portion continuously executes the interrupt operation.

4. The controller for the opening and closing member according to claim 1, wherein
when the detection portion detects that the door is changed from the opening state to the closing state in a period from a time point before the determination portion determines that the foreign matter exists to a time point after the determination portion determines that the foreign matter exists, the control portion executes the restart operation at a time point that a predetermined time period has elapsed from a time point that the interrupt operation is executed.

5. The controller for the opening and closing member according to claim 4, wherein
the controller includes a switching portion, and
the driving mechanism includes a motor and the switching portion of the controller is electrically connected with the motor, and
when the detection portion detects that the door is changed from the opening state to the closing state in a period from a time point before the determination portion determines that the foreign matter exists to a time point after the determination portion determines that the foreign matter exists, the control portion executes the restart operation at a time point that a protection time period of the switching portion has elapsed from a time point that the interrupt operation is executed.

6. The controller for the opening and closing member according to claim 1, wherein
the opening and closing member is a window glass mounted to the door, and
the determination portion determines whether the pinching of the foreign matter is generated due to the window glass in a closing operation of the window glass and determines whether the involvement of the foreign matter is generated due to the window glass in an opening operation of the window glass.

7. The controller for the opening and closing member according to claim 1, further comprising a door switch configured to generate a door opening-closing signal based on the opening and the closing state of the door, wherein the detecting portion detects the opening and closing state of the door based on the door opening-closing signal.

8. The controller for the opening and closing member according to claim 1, wherein
the determination portion identifies the existence of the foreign matter pinched between the opening and closing member and the peripheral member based on a reduced speed of the opening and closing member in the opening and closing operation.

9. The controller for the opening and closing member according to claim 1, wherein
the determination portion identifies the existence of the foreign matter pinched between the opening and closing member and the peripheral member when a time of the opening and closing operation exceeds a predetermined time.

10. A controller for an opening and closing member, comprising:
a driving mechanism configured to execute an opening and closing operation of an opening and closing member mounted to a door of a vehicle, the opening and closing operation including an opening operation and a closing operation;
a detector configured to detect at least one of a speed and a time period of the opening and closing operation of the opening and closing member; and
a microprocessor configured to:
execute a first operation of the driving mechanism in a case where the opening operation of the opening and closing member is achieved, and
execute a second operation of the driving mechanism in a case where the closing operation of the opening and closing member is achieved, and
identify an opening and closing state of the door, the opening and closing state including an opening state and a closing state;
wherein the microprocessor in combination with the detector identify:
a pinching of foreign matter between the opening and closing member and a peripheral member based on at least one of the speed of the opening and closing member and the time period of the opening and closing operation,
wherein when the pinching of foreign matter is identified during operation of the driving mechanism, the microprocessor executes an interrupt operation command to interrupt operation of the driving mechanism, and
wherein when a change between the opening state and the closing state of the door is identified within a time period from a time point before detection of the pinching of foreign matter to a time point after detection of the pinching of foreign matter, the microprocessor executes a restart operation to restart one of the first operation and the second operation of the driving mechanism that was in operation immediately before the interrupt operation command.

11. The controller for the opening and closing member according to claim 10, further comprising a door switch configured to generate a door opening-closing signal based on the opening and the closing state of the door, wherein the microprocessor detects the opening and closing state of the door based on the door opening-closing signal.

* * * * *